United States Patent [19]

Sekellick

[11] Patent Number: 4,552,669
[45] Date of Patent: Nov. 12, 1985

[54] PNEUMATIC HYDRO-PULSE FILTER SYSTEM AND METHOD OF OPERATION

[75] Inventor: Ron S. Sekellick, Prospect, Conn.

[73] Assignee: Mott Metallurgical Corporation, Farmington, Conn.

[21] Appl. No.: 485,884

[22] Filed: Apr. 18, 1983

[51] Int. Cl.⁴ .................................................. B01D 23/24
[52] U.S. Cl. ...................................... 210/798; 210/805; 210/323.2; 210/333.01; 210/410
[58] Field of Search ............... 210/791, 798, 772, 797, 210/333.01, 333.1, 332, 323.2, 412, 410, 805

[56] References Cited

U.S. PATENT DOCUMENTS

| | | | |
|---|---|---|---|
| 2,754,005 | 7/1956 | Tursky | 210/323.2 |
| 2,981,416 | 5/1961 | Lawlor | 210/333.1 |
| 2,985,306 | 5/1961 | Statzell | 210/333.1 |
| 3,267,649 | 8/1965 | Vicard | 210/433.1 |
| 3,280,980 | 10/1966 | King | 210/108 |
| 3,637,079 | 1/1972 | Strub | 210/333.01 |
| 3,744,633 | 7/1973 | Schmidt, Jr. et al. | 210/333.01 |
| 4,256,583 | 3/1981 | Lennartz | 210/333.1 |
| 4,282,105 | 8/1981 | Crowe | 210/412 |
| 4,405,466 | 9/1983 | Giannelli et al. | 210/333.01 |

FOREIGN PATENT DOCUMENTS

2757090  6/1978  Fed. Rep. of Germany ... 210/333.1

Primary Examiner—Barry S. Richman
Assistant Examiner—Titus B. Ledbetter, Jr.
Attorney, Agent, or Firm—Prutzman, Kalb, Chilton & Alix

[57] ABSTRACT

A repeatably rejuvenating filtration system of the pneumatic hydro-pulse type is disclosed as including the feeding of a solid/fluid feed slurry to be filtered into operative engagement with the interior porous wall surfaces of a plurality of open ended tubular filter elements so that filtrate passes outwardly through the walls of the filter elements and the solids are collected as a cake on the interior wall surface. The cake of solids on the interior wall surface is subjected to an axial discharge fluid flow through the interior of the filter elements along the length of the cake for removal of the cake axially along the interior of the filter elements. The system includes an arrangement for providing a pressure actuated pulse of fluid that may operate through the cylindrical walls toward the axial bore of the filter tubes to dislodge the filtered material, and may operate substantially simultaneously with the axial discharge flow for conducting the dislodged filtered material from the open ended bores. The versatility of the system enables the use of a recirculating arrangement that is effective to concentrate the solids content and control the thickness of the cake deposit.

32 Claims, 3 Drawing Figures

PNEUMATIC HYDRO-PULSE FILTER SYSTEM AND METHOD OF OPERATION

BACKGROUND AND SUMMARY OF THE INVENTION

The present invention relates generally to solid/fluid separation systems and is more particularly directed to a new and improved filter system of the pneumatic hydro-pulse type employing repeatably recleanable filter elements and to a new and improved method of operating such a system.

In prior pneumatic hydro-pulse filter systems, the feed slurry of a separable solid/fluid mix flows into the bottom of a tank holding an array of vertical tubular filter elements that are closed at their bottom ends. The slurry comes into contact with the exterior surface of the tubes causing the solid material to be retained on the exterior of the filter elements while the liquid or fluid passes therethrough into the interior of the tubes and subsequently out the top of the tank. The filtered solids restrained by the tubes form a loose cake on the exterior of the filter elements. These outside-in filter systems typically use a low fluid approach velocity so as not only to provide a surface filtration effect with restricted filter intrusion but also to permit a pulsed backflow radially through the filter elements to remove the filtered solids on the exterior of the filter elements. A sudden pulse that forces filtrate through the walls of the filter elements is effective to "blow" or dislodge the cake from the exterior of the filter surfaces. The dislodged solids are then drained from the tank structure or housing, by totally evacuating all the fluid within the housing. Thereafter the filtration process is restarted.

These prior outside-in systems exhibit several drawbacks such as the uneven or incomplete discharge of solids on the exterior of the filter tubes resulting in an undesirable deterioration of fluid velocity along the length of the filter tubes. Additionally, the prior systems evacuated the entire housing during flushing thereby using and losing an excessive amount of liquid during the flushing operation. They also exhibited a complete lack of versatility for various filtration applications and required a shut down in the feed line. However the most notable deficiencies come to light with respect to the filtering of dispersed fibrous solids. The fibers tended to form a wet mat about the exterior of the filter elements. This mat does not satisfactorily separate or blow free from the filter elements upon application of the hydraulic pulse to permit the requisite draining of the accumulated fibrous mats. The fibrous material that does separate may reslurry or remain in clumps and tends to "hang up" on the frame structure supporting the filter elements, clogging the upstream side of the filter unit.

In accordance with the present invention it has been found that these and related disadvantages can be obviated by providing a new and improved filter system and method of operation that utilizes an axial flushing action through the center of open ended filter tubes and provides substantially greater versatility and flexibility of operation. In such a system the solid/fluid slurry first engages the inside, rather than outside, walls of the porous filter tubes. The inside walls provide surfaces that are free of structural support members and are open ended so as to communicate directly with both the inlet and solid discharge areas of the system. Since the particles are not collected on the outside of the filter elements, more elements can be used within the same space thereby achieving greater filtering surface area and a more efficient axial discharge operation. A pressurized backflow pulse of fluid that moves radially through the tubes tends to lift the layer of accumulated solids from the surface of the tubes as a cohesive mass while providing a thin fluid film between that mass and the interior surface of the tubular filter elements. The film acts as a fluid bearing that cooperates with the axial discharge flow to allow easy and efficient discharge while advantageously using less filtrate for flushing the solids from the system.

Another feature of the invention is its ability to accommodate a wide variety of operating modes utilizing flow from both the top and bottom of the system as well as recirculating flow, all with improved efficiency, and its adaptability to a wide variety of filtering applications with the collected solids discharged as a slurry, a semi-dry paste or a fully dry material. Included is the provision for a filter system that is efficient and economical in operation, variable in its ability to accommodate multiple units of the same or different operating modes yet can be adjusted to preserve and reclaim either the solid, the filtrate or both with increased filtering efficiency.

Other features and advantages will be in part obvious and in part pointed out more in detail hereinafter.

It has now been found that the foregoing and related objects and advantages can be readily obtained in a filter system and method of the type described that includes the provision for an elongated filter array comprising a plurality of tubular filter elements having interior wall surfaces forming interior open ended axial bores, the introduction of a flow stream of a solid/fluid feed slurry into simultaneous operative engagement with the interior wall surfaces of each of said tubular filter elements of the array at a sufficient pressure and controlled velocity so that the fluid of the slurry passes outwardly through the walls of the tubular filter elements and the solids within the slurry are collected as a cake on the wall surfaces without substantial intrusion into the porous filter element, and the provision for a discharge fluid flow axially through the interior of the tubular elements along the full length of the cake for removal of the cake of solids axially along the interior of the tubular filter elements and out the open end thereof. The system can employ a sudden pressure pulse that is applied to the cake to dislodge the filtered solids from the interior tube surface, and assist in the rapid axial discharge of the dislodged solids out of the open bores of the filter tube elements. The pressure pulse can provide a periodic radial backflow pulse of fluid inwardly through the cylindrical walls of the filter tubes to dislodge the filter solids from the interior surface of the cylindrical walls while a discharge outlet assists in the pulsing operation. The versatility of the system lends itself to numerous and varied modes of operation, including the use of multiple associated units operated in similar or different modes.

A better understanding of the invention will be obtained from the following detailed description and accompanying drawings which set forth the several steps and the relation of one or more of such steps with respect to each of the others and the system possessing the features, characteristics, properties, and the relation of elements exemplified herein.

DESCRIPTION OF THE PREFERRED EMBODIMENTS

As mentioned, the present invention is concerned with a new and improved system and method of operation in a repeatably recleanable pneumatic hydro-pulse filter system. In this system an inside-out flow path is provided for the feed slurry through each of the tubular porous filter elements within the filter tube array. The feed slurry typically has fine solid particulate material dispersed throughout and carried within a fluid medium. This slurry preferably is brought into operative fluid engagement with the interior bores of the tubular filter elements so that the fluid portion of the slurry readily passes through the cylindrical walls of the filter media along an "inside-out" flow path while the solid materials are collected on the smooth interior wall surfaces of the tubular filter elements rather than on the exterior surfaces as in prior filtration methods.

The filtered solids are periodically cleaned off to rejuvenate the filter. This is achieved by applying a rapid axial flushing of the interior bores of the open ended filter tube elements, preferably coupled with a backflow or "outside-in" pulse of fluid radially through the porous walls of the filter tubes to dislodge or jolt the solids free from the interior walls and sweep them axially toward a discharge area. The backflow pulse tends to blow or dislodge the collected solids from the interior surface while the rapid axial flushing can provide a scrubbing effect that removes the particles from the walls and directs them towards the center of the axially moving discharge stream. This improves the particle removal at the filter tube wall without disturbing subsurface filtering particles while at the same time reducing filtrate utilization during the flushing operation. In some embodiments of the present invention, the application of the backflow pulse and the axial flushing action are one continuous and simultaneous operative step but for clarity of description and ease of understanding separate axial and radial fluid flow steps will be described herein unless otherwise designated.

It is an advantage of the system of the present invention that during the initial filtering phase of the process, the feed slurry can be continuously introduced from a feed slurry inlet line toward the interior axial bore and into simultaneous operative engagement with the interior porous wall surface of each of the filter tube elements from both ends of those open ended elements. This flow is at a sufficient pressure so that the fluid of the slurry passes through the porous cylindrical walls of the filter tube elements in an inside-out direction. When flow is directed simultaneously from both ends of the filter tubes, a significant increase in filtrate production and filtration efficiency is achieved. A complete explanation of this phenomenon is not as yet available but it is postulated that the dual feed tends to classify the particles with the finer particles accumulating at the longitudinal center of the tubes. Such a theory would favor filter tube elements of long length. However, regardless of the correct explanation, the system of the present invention facilitates not only slurry feed from either the top or bottom of the filter element but also, advantageously, from both ends simultaneously. As will be noted later, this also provides greater versatility of operation during the axial discharge flow sequence of the solid removal operation. Alternately, as will be discussed later in connection with one operative embodiment of FIG. 3, the feed may be introduced through only the upper or lower ends of the tubes at a higher velocity for recirculation to provide a high filtrate recovery with limited solid retention on the interior walls of the filter tubes.

The solids within the slurry collect as a loose cake on the interior surfaces of the filter tube elements without substantial intrusion into the porous filter element. However some of the extremely fine particles within the slurry will penetrate the porous interior surfaces to provide a subsurface particle array that improves the filtering characteristics of the tube elements. Some of these particles are removed during the backflow pulse of filtrate, however some of the particles are retained therein and are utilized for their filtering effectiveness during subsequent operating cycles of the system. As mentioned, when only axial flushing of the system is employed these subsurface particles remain substantially undisturbed and need not be replenished.

Periodically the filter tubes must be cleaned. This can be determined by measuring the pressure drop across the filter elements and triggering the cleaning action at a preselected differential pressure level. With the system of the present invention it has been found that higher differential pressure trigger points can be employed. However such higher levels affect the blowback requirements and must be tailored to the specific filtering operation, keeping in mind whether filtrate or solid recovery is of greater importance.

Cleaning of the elements can be effected by rapid axial flow alone or axial flow in combination with a radial backflow. The radial backflow component can be achieved by applying a backflow pressure pulse through the porous walls of the filter tube elements. The backflow pulse is applied by closing off the discharge flow of filtrate and the influx of feed slurry, pressurizing an air space immediately downstream of the porous walls of the filter tube elements and subjecting the exterior surface of the filter tube elements to the pressure pulse. This produces a backflow pulse of filtrate, powered by the pressurized air, in an outside-in radial direction through the cylindrical filter walls to dislodge the collected solids from the interior suface. The pulse is of short duration, typically lasting one second or less with the preferred duration being about 0.5–0.7 seconds, and is effective to jolt the collected solid cake sufficiently at least to facilitate its axial flow removal. For a standard feed slurry line pressure of about 30 psi, a pressure pulse of two to five times the line pressure, for example, 70–100 psi has been utilized with consistently good success. Lower pulse pressures may also be employed so long as the pulse is of sufficient strength to dislodge the cake material from the interior surface of the filter elements. With the inlet feed slurry and outlet filtrate being closed off, the solids then are flushed from the interior bores by the force of the axial gravity flow therethrough as the discharge outlet is opened. The discharge outlet may then be closed and the filtrate and inlet feed slurry lines reopened to restart the filtration process. The backflow pulse and flushing procedure is thereafter repeated periodically as a function of either time, flow, pressure differential radially across the cylindrical wall, etc.

The system of the present invention readily lends itself to alternative provisions for achieving the short backflow pulse. In this connection a secondary air pocket can be provided upstream of the filter tube elements, as for example in the upper chamber which receives the inlet feed slurry. The secondary air pocket provides an air cushion for the backflow pulse of pressurized fluid. Again, both the inlet feed slurry line and the outlet filtrate line are closed off to flow. Pressurized air having a pressure greater than the secondary air pocket can be applied to the air space used for pulsing at a location downstream of the filter elements in much the same manner as mentioned hereinbefore. Because of the presence of the secondary air pocket, a backflow of pressurized fluid can be applied to the filter tube elements well prior to opening the discharge drain thereby providing inward radial flow of filtrate and causing the collected solids to lift off the interior surface. This can be particularly beneficial when thick, very dense cakes of solid material are present. Thereafter, the discharge outlet drain is opened to cause an axial flushing action through the interior bores of the filter tubes elements and the collected solids are thereby drained out of the discharge outlet. During the flushing action, the liquid filtrate provides a thin fluid layer or bearing along the interior surface of the axial bores to facilitate the flushing and draining operation. The secondary air pocket will equalize in pressure during radial filtrate flow and will assist in powering the axial flushing action. The discharge drain valve is then closed and the inlet feed line is reopened to restart the filtration process. This mode of operation can be beneficial where the filtrate collection is not particularly important since larger volumes of fluid are utilized by this procedure.

Alternately, the backflow pulse of pressurized fluid can be applied to the outlet filtrate line during continual filtration with a momentary opening of the discharged drain to drain out dislodged solids. An air cushion is not provided during such a mode of operation.

In an alternate method particularly adapted to conserve filtrate, the filter assembly is drained of filtrate after closing off the inlet feed slurry line but prior to application of the backflow pulse. A backflow pulse of pressurized air is then applied outside-in to the filter tube elements to blow off the collected solids. The dislodged solids are drained out of the interior bore by axial flow and the filtration process is restarted as previously described. The utilization of an air pulse limits the flushing liquid to the feed side of the system for maximum filtrate recovery.

As mentioned a feature of the system of the present invention is the axial flushing or discharge of the solid material collected within the interior of the porous filter tubes. The axial flushing action concentrates the discharge forces acting on the collected cake of solid material while minimizing the volume of fluid required for the discharge operation. Additionally, it enhances the versatility of operation of the system and cooperates with the radial flow of fluid during the backflow pulse operation to maximize the efficiency of the discharge. The axial flow is operable regardless of whether the feed slurry chamber above the tubes is completely or partially filled with feed slurry or is fully drained to provide a dry recovery of the collected solid materials. For example, in a preferred operating mode where no air pocket is provided upstream of the filter tubes but the air pocket downstream thereof is pressurized, the opening of the discharge valve will provide an initial radial pulse through the tubes followed immediately by the axial discharge flushing action. If desired, the discharge valve can be closed after only a very brief interval, for example, two seconds or less, thereby removing the solid cake from the tubes but minimizing the volume of material removed from the system. Alternately an air pocket can be provided upstream to impart an axial pressure pulse to the discharge. In all of these various modes the axial discharge flow through the tubes drives the solid cake along the interior of the tubes and out their open ends toward the discharge valve while axially scrubbing the interior of the tube. This action also permits the continuous flow of feed slurry to the tops of the tubes even during discharge.

The axial flow can be accomplished in conjunction with a simultaneous radial flow to provide a boundary layer or bearing of fluid between the cake and the interior surface of the tube which lubricates the smooth interior surfaces of the tubes and enhances the discharge. This, of course, uses filtrate within the system. In those instances where conservation of filtrate is important, all filtrate can be removed and the axial flow has the additional benefit of leaving undisturbed the subsurface particles on the porous filter tube walls.

The method of the present invention also lends itself to a mode of operation wherein a main stream of feed slurry is recirculated continuously through the axial bores of the open ended filter tube elements at a higher flow velocity. This procedure attains high filtrate recovery and limited solid accumulation as well as surface filtration by the thin cake of solids on the porous walls of the filter tube elements, that is, the cake acts as the primary filter. For such a mode of operation, the feed slurry is fed into one end of the axial bores at a velocity sufficient to attain surface filtration by the porous walls of the filter tube elements. In a manner somewhat similar to that previously explained, a major portion of the liquid phase of the slurry passes through the porous walls of the filter tube elements leaving the solids collected on the interior surface of the filter tube elements. As the solids cake accumulates it exhibits a radial density gradation and is more dense at the wall and has greater integrity at that location than at the portion closer to the axis of the tube. The compactness or density of the cake is a function of the radial flow velocity and associated radial differential pressure across the filter bed. Of course denser cake is formed at a higher radial pressure drop and will provide a finer filtration function. The thickness of the cake, on the other hand, is a function of the axial flow velocity, with both density and thickness being independently variable and controllable in the system of the present invention. The axial velocity of the recirculating slurry will erode the cake nearest the center of the bore after it reaches a certain thickness. Since the velocity of the slurry both through the axial bore of the filter tube elements and radially thereacross can be controlled, there is established a permanent "nonerodable" porous filter cake composed of solid particles of various diameters which form a porous structure of a finite thickness supported on the interior wall of the filter tubes. The cake is believed to be formed by those particles whose size and weight permit them to settle on the walls at the recirculating flow velocity. Thus, the surface cake structure is controlled by the axial and radial flow velocities of the recirculating slurry. With the establishment of a solids cake and a fluid velocity sufficient to maintain a solids suspension in the flow stream yet not so great as to completely dislodge the deposited cake, a steady state condition can be maintained at an established pressure drop across the filter. As the addition of feed slurry of low concentration progresses, it is balanced by the removal of filtrate and concentrated slurry to provide a continuous operating system. For example, it has been found that such a recirculating system can concentrate a feed slurry containing 0.1 percent solids to a discharge slurry containing about 15 percents solids in a continuous operation and at such a rate that no additional concentration takes place in the system, that is, a steady state can be maintained. The size of the cake also remains substantially constant since the flow velocity is well below that required for an inertial filter where little or no solids deposition takes place on the filter element walls.

Within certain recirculating modes, the concentrated slurry, including the heavier solid particles, flow at an intermediate velocity. In such a system the balancing of the system favors a velocity where settling occurs. In that instance, the mainstream slurry will thus be concentrated so as to eventually produce a settling out of the heavier particles for discharge. The interior surface of the filter elements can be cleaned through the use of a backflow pulse of pressurized fluid as previously described and discharged along with the heavier particles which have settled out of the mainstream slurry. This discharge can then be treated in a second interconnected system to more completely remove the liquid therefrom.

The versatility of the system further permits semi-dry or dry recovery of the solids. The semi-dry recovery is particularly desirable for catalyst recovery due to the pyrophoric nature of certain catalytic material. In accordance with this mode of operation it has been found that the system may be operated in its filtering mode until the interior of the filter tube elements are completely filled with catalyst particles along their entire lengths. The fluid flow then is terminated and all filtrate and feed slurry is drained therefrom to the extent possible. Air under pressure is then passed through the feed valves and the collected cake to sweep entrapped liquid through the filtrate outlet. This typically causes the collected cake to contract axially from each end. The feed chamber above the tubes is subject to a high pressure air pulse and the discharge valve is opened thereby axially driving the semi-dry cake or plug toward the discharge area. In this manner the collected solids are confinably contained within the tubes and rapidly delivered to the discharge area as a semi-dry plug of paste-like consistency typically exhibiting a solids content of about 40-50%. The axial discharge scrubs the walls of the tubes and compensates for any irregularity in the porosity of the tube walls while providing a resultant product comparable to that achieved in a dewatering press. Thus the system combines the features of a polishing filter and a dewatering filter. This is coupled with the flexibility of providing a discharge ranging in consistency from a dilute slurry to a solid particulate. Further, this result is achieved without introducing other materials into the system.

Thus, a repeatably rejuvenating filtration process is provided which accommodates a variety of operating modes and adapts to a wide variety of filtering applications. As described, the process can be adjusted to preserve and reclaim for reuse either the solids, the filtrate, or both. Recovery of the solids is highly desirable where precious metals such as gold, platinum, etc. are concerned. For example, the process is well adapted for the removal of ore fines from "strip solution" in commercial gold mining operations downstream of the centrifuge used for primary product recovery. As mentioned, the process is also particularly suited for the recovery for reuse of various expensive catalysts as well as other high cost materials.

The porous cylindrical wall of the filter tube elements is composed of a filter media of controlled porosity and permeablity. According to a known procedure, commonly referred to as a sintering process, a controlled porosity material is obtained by the consolidation of a metal powder into a porous aggregate. The consolidation can be attained by what is known as a "no pressure sintering process" or the powder can be precompressed into a form by the application of a controlled pressure and the subsequent heating to the sintering temperature. The sintering process is carried out at temperatures approaching the melting point of the particular alloy being manufactured, and in a controlled, preferably nonoxidizing atmosphere. The atmosphere is usually reducing in nature, and serves the purpose of removing surface oxide films from the powder particles, and protecting the surfaces throughout the sintering cycle. While the porous structure is at sintering temperature and under the influence of the reducing sintering atmosphere, the individual particles bond to their adjacent neighbors by the process of solid state diffusion, thus transforming the loose powder or precompacted from into a coherent matrix with interconnected pores of high tortuosity. For example, an acceptable filter for producing cleanable, reuseable filters is an ultrafine grade of stainless steel. Other acceptable materials such as copper, nickel, Monel, Inconel, hastelloy as well as other metals or alloys, including precious metals may also be utilized.

Figure 1:
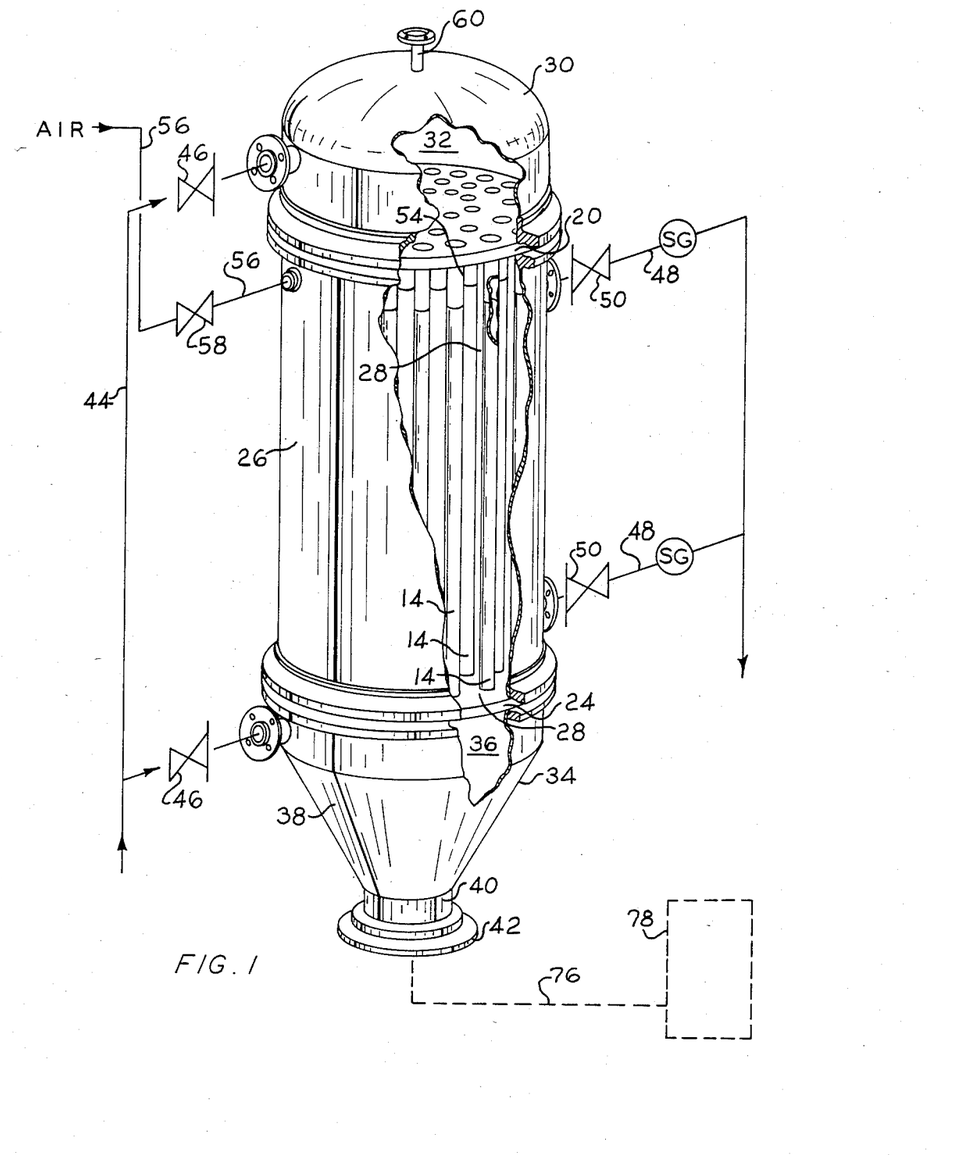
FIG. 1 is a perspective view, partially broken away and partially in section, of a new filter chamber used in the system of this invention.
Figure 2:
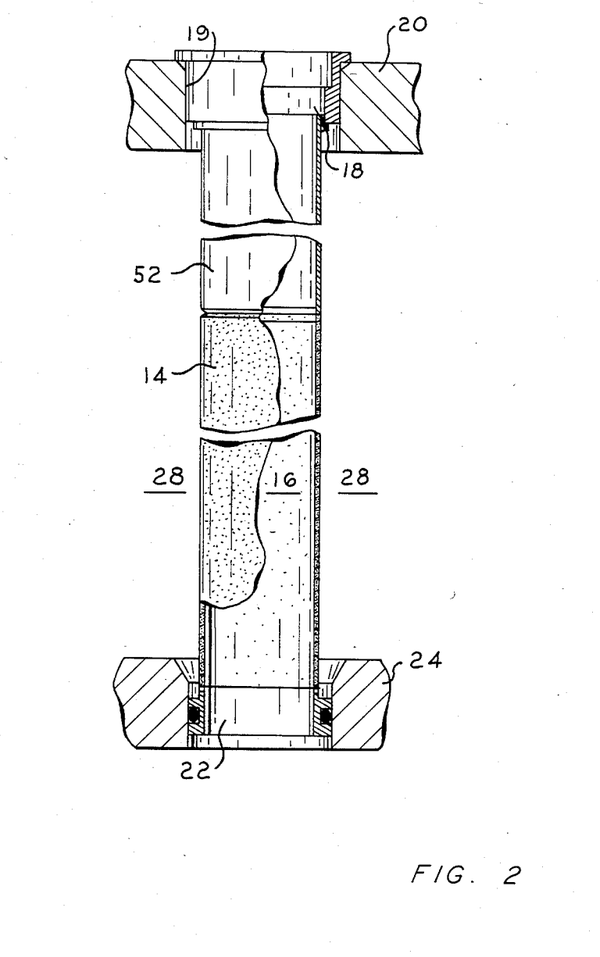
FIG. 2 is an enlarged elevational view, partially broken away and partially in section, of one filter element of the filter tube assembly of FIG. 1 showing detail of its mounting within the top and bottom plates of the system.

Turning now to the drawings and particularly to FIGS. 1 and 2, the filter system of this invention includes an assembly or array of elongated filter tube elements 14 mounted within a suitable housing. Each filter tube 14 is open at both ends and has a cylindrical wall with an inner surface forming an interior axial bore 16. The upper end 18 of each filter tube 14 is securely mounted within the apertures 19 of an upper plate 20 and sealed by an O-ring or other suitable connecting seal. Similarly, the lower end 22 of each filter tube 14 is securely mounted within a corresponding aperture in a lower plate 24. The filter tubes 14 are oriented generally parallel to each other and rigidly interconnected by the plates 20 and 24 to form a rigid filter assembly.

The filter assembly is mounted within a cylindrical shell 26. The shell 26 extends between the upper plate 20 and the lower plate 24 so as to form a central fluid chamber 28 about and between the exterior of the filter tubes 14. As seen in FIG. 1, a dome 30 encloses the top of the upper plate 20 to form an upper fluid chamber 32 communicating with open ends 18 of the tubes 14. Similarly, a cover 34 encloses the bottom of the lower plate 24 to form a lower fluid chamber 36 communicating with open end 22 of the tubes. The upper ends of the axial bores 16 open into the upper fluid chamber 32 through the apertures of the upper plate 20 and the lower ends of the axial bores 16 open into the lower fluid chamber 36 through the apertures of the lower plate 24. The cover 34 has a wall 38 tapering inwardly towards a discharge outlet 40 to facilitate the draining of solids from the filter elements 14. A normally closed discharge valve 42 controls the opening and closing off of the discharge outlet 40.

An inlet slurry feed line 44 is controlled by inlet valves 46 and is fluidly connected to the upper fluid chamber 32 and to the lower fluid chamber 36. An outlet filtrate line 48 is fluidly connected to the fluid chamber 28 and controlled by outlet filtrate valves 50.

As best seen in FIG. 2, the upper end 18 of the cylindrical wall of the filter tube 14 comprises a nonporous sleeve portion 52 so that the upper plate 20, the sleeve portions 52, and the shell 26 combine to form a space 54 that can contain an air pocket in the upper portion of the fluid chamber 28. An air supply line 56 is controlled by a regulator valve 58 and connected to the space or air pocket 54. The air supply line 56 is connected to a source of pressurized air or an accumulator of the type described hereinafter with respect to FIG. 3 to permit a controlled pressurization of the air pocket 54. Thus the space 54 provides a pressure pad that equalizes the pressure over all of the tubes within the chamber 28. A vent valve 60 is connected to the top of the dome 30 to permit the selective venting of the upper fluid chamber 32.

In operation, feed slurry is introduced into both chambers 32 and 36 by the inlet feed line 44. The slurry flows from the chambers 32 and 36 into the open axial bores 16 of the filter elements 14. The cleansed liquid or filtrate passes outwardly through the porous cylindrical wall of filter tube 14 into the fluid chamber 28. The filtrate flows outwardly from the upper and lower ends of the fluid chamber 28 through the outlet filtrate line 48. The solid material contained in the slurry forms a loose cake on the interior surface of the cylinder wall. Thus, the filtrate flows inside-out through the cylindrical walls of the filter tubes 14 to leave the filtered solid material on the interior surface of the cylindrical walls.

Periodically during the filtering operation, the cylindrical walls of the filter tubes 14 are automatically cleansed or "backwashed" of solid material. To clean the solid material from the interior surface of the cylindrical walls, the inlet feed line 44 is closed off by valves 46 and the outlet filtrate line is closed off by valves 50. The air pocket 54 is pressurized to an elevated pressure preferably 70 to 100 psi. A regulator valve or an accumulator of the type described hereinafter with respect to FIG. 3 can be utilized to selectively determine the pressure of the air pocket 54.

After the pressurization of the air pocket 54, the discharge valve 42 is opened to produce a pulsed backflow of filtrate through the cylinder wall of the filter tubes 14. Since the pressurized air pocket is downstream of the filter tubes 14, the filtrate backflows outside-in through the cylinder wall into the axial bores 16. The pulse backflow is of a sufficient magnitude to dislodge the solid material from the interior surface of the cylinder walls. Thereafter, the dislodged solids drain axially downwardly through the tubes 14 and out the discharged outlet 40. The discharge valve 42 returns to a closed position and the valves 46 and 50 are reopened to continue the filtration process.

Where fibrous solids are being filtered, a mat of fibers is collected and formed within the axial bores 16 on the interior surface of the cylindrical wall of the filter elements 14. The hydraulic pulse of filtrate outside-in through the cylindrical walls applies an inwardly directed compacting force on the mat of fibrous solids to dislodge the mat inwardly so that the axial drainage of liquid, i.e., feed slurry and filtrate, down through the axial bores 16 flushes the dislodged fibrous solids out of the filter elements 14 and out the discharge outlet 40. The interior surface of the cylindrical wall of the tube element 14 is relatively smooth and does not present any protrusions which would hang up the fibrous solids. Since the fibrous solids are flushed down the interior bore of the filter elements, there is no undesirable contact with the filter support assembly and an effective axial flushing action is attained. Moreover, the liquids within the axial bores provide a fluid bearing along the interior surface to further facilitate the flushing action.

The pulsed backflow operation is of relatively short duration, being of the order of one second or less. Thus, the interruptions in flow are short. The period between applications of the backflow pulse can be determined by sensing several different parameters in the filter system depending upon the particular filtering application, e.g., differential pressure across the cylindrical filter wall, total flow of filtrate or feed slurry, time, etc.

As mentioned, the present invention provides substantial versatility in operation so as to be adaptable to varied filtering applications. In the embodiment of FIG. 1, both the inlet slurry feed lines and the outlet filtrate lines can be modified. For example, the slurry may be introduced at either the top or bottom of the filter tube elements and the filtrate may be removed from either the top or bottom of the fluid chamber 28. Such versatility also allows the filter system to exhibit inertial filter qualities in certain modes.

Figure 3:
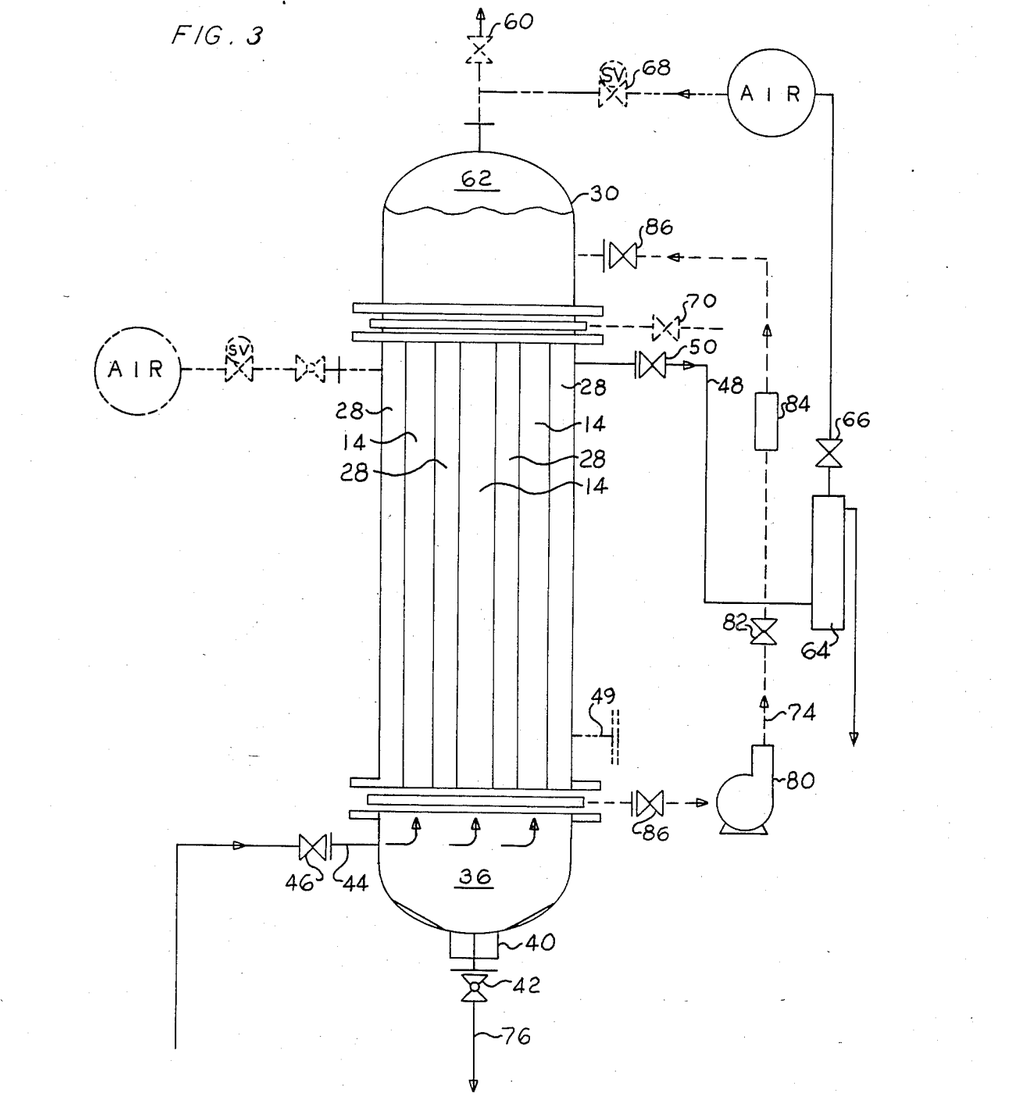
FIG. 3 is a schematic view of an alternate embodiment of the filter system of the present invention with optional or alternate features shown in phantom.

Turning to FIG. 3 wherein like numerals are used to designate the same or similar parts, a schematic view of an alternate embodiment of this invention is shown with additional components shown in phantom line. The additional components shown in phantom line are utilized in various combinations to provide additional embodiments of the present invention.

In the embodiment of FIG. 3 (solid line), the feed slurry enters the lower fluid chamber 36 and flows into the axial bores 16 of the filter tubes 14. The filtrate passes through the cylindrical walls of the filter tubes 14 into the fluid chamber 28 and out through the upper outlet filtrate line 48. The dome 30 is not vented and contains an air pocket 62 which is upstream of the filter tube elements 14. The air pocket 62 trapped within the dome 30 will provide an air cushion for the backflow pulse of fluid through the filter tubes 14.

As in the prior embodiment, the filtered solids collect upon the interior surface of the cylindrical wall which forms the axial bore 16 of the filter tubes 14. An accumulator 64 is connected to a source of pressurized air through a regulator valve 66 and is connected to the outlet filtrate line 48 in order to provide a predetermined backflow pulse of fluid to the filter tubes 14. After a predetermined amount of filtered solids have collected on the interior surface of the cylindrical wall of the filter tubes 14, the inlet feed line valve 46 and the outlet filtrate valve 50 are closed off. The accumulator 64 is pressurized to a predetermined pressure substantially above the air pressure contained in the air pocket 62. The outlet filtrate valve 50 is then reopened to apply a backflow pulse of fluid to the filter tubes 14, i.e., the clean filtrate backflows through the filter elements 14 to dislodge the filter solids collected on the interior surface. The air pocket 62 provides an air cushion to this backflow pulse.

Thereafter, the discharge valve 42 opens and the entire volume of the filter tubes 14 including the filtered solids is flushed out through the discharge outlet 40. The flushing action results from the pressure applied by the backflow pulse and by the air pocket 62. The discharge valve 42 then closes and the inlet feed line valve 46 reopens to continue the filtration process. Alternatively, pressurized air could be introduced through valve 68 into the air pocket 62 (prior to reopening the outlet filtrate valve 50) to increase the flushing force of the liquid through the axial bores 16.

In another mode of operation, the fluid chamber 28 is drained of filtrate through outlet line 49 and a pulse of pressurized air is applied directly to the filter elements 14 by the accumulator 64 to blow off the collected solids into the axial bores 16. This procedure prevents the loss of any filtrate out of the discharge outlet 40 and is utilized to conserve valuable filtrate.

In a further mode of operation, the dome 30 is vented by the vent valve 60 to eliminate any air pocket therein. The fluid chamber 28 can also be selectively vented by the vent valve 70. Upon the build up of solids on the interior surface of the cylindrical walls of the filter tubes 14, the accumulator 64 is pressurized to a predetermined pressure significantly in excess of the filtrate line pressure and a backflow pulse of fluid is applied through the filtrate line 48 to the filter tubes 14 without closing the inlet feed line valve 46. The solids are thus dislodged from the filter tubes 14 and the discharged valve 42 momentarily opens to discharge the dislodged solids. In this manner, an external source of pressurized fluid is utilized and the closure of the inlet and outlet valves is not necessary.

As mentioned, the slurry can be recirculated through the assembly either by using the feed line 44, preferably in a clockwise direction as viewed in FIG. 1, or by means of a separate recirculating route such as the line 74 shown in FIG. 3. This will concentrate the solids within the recirculating slurry and, in some instances, within the lower fluid chamber 36. Control of the flow velocity as mentioned hereinbefore will maintain the thickness of the cake of solids collected on the interior of the tubes 14. Such a system permits the connection thereto, for example, at chamber 36 or discharge outlet 40, of a similar system in series. The effluent from outlet 40 then can pass through line 76 for treatment in a separate system 78 as hereinbefore described in connection with FIGS. 1 or 3 or to provide dry or semi-dry recovery of the solids as discussed hereinbefore. As shown in FIG. 3, a recirculating pump 80, control valve 82 and flow meter 84 may be incorporated into the recirculating line along with appropriate shut off valves 86.

Such a system, when properly controlled, will provide filtering functions heretofore found impossible with other systems. For example, a typical barrier type filter was found to be completely ineffective for filtering organic polymer particles in an aqueous suspension. Such a slurry containing 500 ppm of polymer caused the barrier filter to plug immediately with no filtrate collection when operated at a flow rate of 0.05 gpm/sq.ft. at a differential pressure of 80 psi. across the filter element. However, using the same polymer suspension at the same concentration, the recirculating system described herein operated successfully during an eight hour test. In this system, the flow rate was the same but the slurry was recirculated in the manner described in connection with FIG. 3 at an axial velocity of about 1.7 to 1.9 ft/sec. This velocity was effective to prevent plugging of the filter element and allow the deposition of a solids cake having a thickness of about 0.010-0.015 inch. A steady filtrate flow rate was sustained for the full period of the test and showed no trend toward deterioration. At the end of the test the recirculating slurry showed a twenty fold concentration over the feed slurry, that is, up to 1 percent from 0.05 percent solids.

Thus, it can be seen that a versatile and flexible pneumatic hydro-pulse filter system is provided which is adaptable to a wide variety of filtering applications and is particularly effective for the filtration of numerous different types of materials.

As will be apparent to persons skilled in the art, various modifications and adaptions of the structure and method above-described will become readily apparent without departure from the spirit and scope of the invention.

I claim:

1. A repeatably rejuvenated filtration system comprising:
    an elongated filter array comprising a plurality of open ended rigid tubular porous filter elements having relatively smooth interior wall surfaces forming interior axial bores;
    means for providing a flow stream of solid/fluid feed slurry to be filtered;
    means for feeding the slurry into simultaneous operative engagement with the interior wall surface of each of said tubular filter elements at a sufficient pressure so that the fluid of the slurry passes outwardly through the walls of the tubular filter elements and the solids within the slurry are collected as a cake on the wall surfaces without substantial intrusion into the porous filter element;
    means for selectively providing an increase in fluid pressure on the downstream side of said filter elements and for providing a brief pressure pulse of fluid radially inwardly through said walls of said porous filter elements into said axial bores to dislodge the collected cake from the interior wall surfaces and to provide a fluid bearing between said collected cake and said interior wall surfaces; and
    means for subjecting the cake of solids to a rapid discharge fluid flow axially through the interior of the tubular element in the absence of filtration so that said fluid bearing coacts with said rapid axial fluid flow to flush the cake of solids axially along the interior of the tubular filter elements out an open end thereof.

2. The system of claim 1 wherein the means for subjecting the cake to fluid flow axially through the element includes recirculating means for providing an axial fluid flow of higher velocity than said feed slurry.

3. The system of claim 1 wherein said means for subjecting the cake of solids to a rapid discharge flow includes means for providing an axial pressure pulse of fluid to said cake of solids along said bores.

4. The system of claim 3 wherein the means for providing the axial pressure pulse includes an air chamber suited for applying a pressurized fluid pulse to the cake of solids for driving the solids axially along the interior wall surfaces of the filter elements.

5. A filter system comprising:

an array of elongated open ended filter tubes, each of said tubes having a porous cylindrical wall with a relatively smooth interior surface forming an interior axial bore;

feed inlet means communicating with the bores for conducting feed slurry to said bores, said means being adapted for connection to a source of feed slurry so that feed slurry flowing through said inlet means enters said axial bores and restrains the solids therein as a cake on said interior surface as filtrate flows outward through said porous cylindrical walls;

filtrate outlet means for conducting filtrate from said filter tubes to a remote location, said filtrate outlet means being in fluid communication with the exterior of said cylindrical walls;

means for selectively providing an increase in fluid pressure on the downstream side of said filter tubes and a brief pressure pulse of fluid radially inwardly through said cylindrical walls of said filter tubes into said axial bores to dislodge the collected cake from the interior wall surfaces and provide a fluid bearing between said collected cake and said interior wall surfaces;

means for selectively providing high velocity fluid flow axially through said axial bore to coact with said fluid bearing to drive the dislodged cake axially along said bore and out of the open end thereof; and discharge outlet means connected to the axial bores of said tubes for conducting the axially dislodged solid material from said bores.

6. The system of claim 5 wherein said means for providing high velocity axial fluid flow includes means for recirculating a slurry through said axial bores to dislodge a portion of the cake and to control the thickness thereof.

7. The system of claim 5 including
a cover forming a fluid chamber with the bores of said tubes opening into said fluid chamber, and
said discharge outlet means includes valve means connected to said fluid chamber for opening and closing off the discharge of said fluid chamber,
whereby the opening of said valve means is effective to promote axial flow of the filtered material from said cylindrical wall and drain at least a portion of said material through said discharge outlet means.

8. The system of claim 5 wherein each of said tubes includes means facilitating the formation of an air pocket downstream of said filter elements.

9. The system of claim 5 wherein the bores of said filter tubes have first and second longitudinally spaced open ends and said inlet feed means is fluidly connected to at least one of said first and second open ends so that feed slurry flows into said tube through said connected end.

10. The system of claim 9 wherein said inlet feed means is fluidly connected to both said first and second ends.

11. The system of claim 5 wherein
said array comprises a plurality of generally parallel filter tubes having upper and lower open ends, an upper plate interconnecting the upper ends of said tubes so that the bores thereof open upwardly of said upper plate, and a lower plate interconnecting the lower ends thereof so that said bores open downwardly of said lower plate,
said system including a shell enclosing the array to form a filtrate chamber about said tubes between said upper and lower plates, said outlet filtrate means being in fluid communication with said filtrate chamber.

12. The system of claim 11 wherein
each said tube has a nonporous sleeve portion at the upper end of said cylindrical wall, said sleeve portions and said upper plate being adapted to contain an air pocket in said shell,
said system including means for supplying pressurized air to said shell for selectively pressurizing said air pocket.

13. The system of claim 5 wherein
said feed inlet means includes first control means for opening and closing off the flow of feed slurry therethrough,
said filtrate outlet means includes second control means for opening and closing off the flow of filtrate therethrough,
said system including a cover forming a lower fluid chamber with the bores of said tubes opening into said lower fluid chamber,
a dome forming an upper fluid chamber with said bores of said tubes opening upwardly into said upper fluid chamber, said upper fluid chamber being adapted to contain an air pocket therein,
said discharge outlet means including a third control means connected to said lower fluid chamber for opening and closing off the discharge of said chamber.

14. The system of claim 13 including means located between said cover and said dome forming a filter chamber, and pressure accumulator means associated with said filtrate outlet means for selectively applying a predetermined pressure level to the filter chamber.

15. The system of claim 5 including
means for recirculating the feed slurry through said filter tube array to concentrate the solids therein,
said discharge outlet means including a normally closed valve means for opening and closing off the discharge of said discharge outlet means.

16. The system of claim 15 wherein the recirculating means includes feed slurry pumping means and means for controlling the flow of slurry during recirculation.

17. The system of claim 15 including a plurality of said filter systems and means for connecting said plurality of filter systems in series, the downstream filtering system communicating with the recirculating means for receiving the concentrated solids therefrom.

18. A repeatably rejuvenating filtration process comprising the steps of:
(a) providing a flow stream of a solid/fluid feed slurry to be filtered;
(b) feeding the slurry into simultaneous operative engagement with a relatively smooth interior porous wall surface of each of a plurality of rigid tubular open ended filter elements at a sufficient pressure so that the fluid of the slurry passes outwardly through the walls of the tubular filter elements and the solids within the slurry are collected as a cake on the wall surfaces without substantial intrusion into the porous filter element;
(c) halting the flow of slurry to be filtered;
(d) selectively increasing filter pressure on the downstream side of the fluid element;
(e) subjecting the cake of solids to a brief fluid pressure pulse inwardly through the walls of the tubular filter elements sufficient to dislodge the cake of solids from the wall surfaces and provide a fluid bearing between the dislodged cake and the wall surfaces; and (f) subjecting the cake of solids on the interior wall surfaces to a fluid flow axially through the interior of the tubular elements so that said fluid bearing coacts with said axial flow for removal of the cake of solids axially along the interior of the tubular filter elements and out the open ends thereof.

19. The method of claim 18 wherein the step of subjecting the cake of solids to a fluid flow axially through the interior of the tubular elements includes the step of subjecting the cake of solids within the tubular filter elements to a brief axial pressure pulse of fluid to assist the axial discharge fluid flow through and out of the elements.

20. The method of claim 18 wherein the brief pressure pulse inwardly through the walls is at a pressure of about 2-5 times the pressure of the feed slurry.

21. The method of claim 18 wherein the brief pressure pulse inwardly through the walls is a pressurized air pulse generated downstream of the filter tube elements.

22. The method of claim 18 wherein the step of subjecting the cake of solids to the brief pressure pulse inwardly through the walls is carried out prior to flushing the interior of the tubular filter elements.

23. The method of claim 18 wherein the step of removal of the cake of solids comprises the step of axially flushing the interior of the tubular filter elements utilizing both feed slurry and filtrate.

24. The method of claim 18 wherein the brief pressure pulse inwardly through the walls and the axial flow are applied to the cake substantially simultaneously.

25. The method of claim 24 wherein the steps of subjecting the cake of solids to the brief pressure pulse inwardly through the walls and axial discharge flow along the interior of the tubular filter elements are carried out within an interim of substantially less than one minute.

26. The method of claim 18 wherein a secondary air pocket is provided upstream of the filter tube elements as a cushion, and the backflow pulse of pressurized fluid is generated downstream of the filter tube elements and is at a greater pressure than the secondary air pocket.

27. The method of claim 18 wherein the slurry fed to the interior of the filter elements is recirculated to induce an axial fluid velocity through the interior of the filter elements sufficient to control the thickness of the cake collected therein.

28. The method of claim 27 wherein the axial fluid velocity is substantially greater than the velocity of the feed slurry flow stream.

29. The method of claim 27 wherein the recirculated slurry is concentrated in solids content.

30. The method of claim 29 wherein the recirculated slurry is maintained at a substantially steady state condition.

31. A filtration process comprising the steps of:
(a) providing a main stream of a solid/fluid feed slurry to be filtered;
(b) feeding said slurry into simultaneous operative engagement with the interior porous wall surface of each of a plurality of rigid tubular filter elements at a pressure sufficient to attain surface filtration by the porous walls of the filter elements so that fluid of the slurry passes outwardly through the walls of the tubular filter elements and solids within the slurry are collected on the wall surfaces of the porous filter elements,
(c) continuously recirculating the feed slurry into the filter elements, and
(d) controlling the axial velocity of the feed slurry into the filter elements to form a controlled filter cake of solids on the porous walls of the tubular filter elements whereby the controlled filter cake of solids acts as a primary filter, including regulating the radial flow velocity of the fluid and the radial differential pressure across the filter to selectively control the density of the cake of solids and regulating the axial flow velocity of the feed slurry to control the thickness of the cake of solids.

32. The process of claim 31 which comprises increasing the density of the cake of solids to provide a finer filtration.

* * * * *